United States Patent
Kazuno

(10) Patent No.: US 11,584,229 B2
(45) Date of Patent: Feb. 21, 2023

(54) DISPLAY CONTROL APPARATUS, DISPLAY CONTROL METHOD, AND PROGRAM

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 211 days.

(21) Appl. No.: 16/929,158

(22) Filed: Jul. 15, 2020

(65) Prior Publication Data

US 2021/0053439 A1 Feb. 25, 2021

(30) Foreign Application Priority Data

Aug. 20, 2019 (JP) .............................. JP2019-150338

(51) Int. Cl.
*B60K 35/00* (2006.01)
*G06F 3/14* (2006.01)

(52) U.S. Cl.
CPC ............... *B60K 35/00* (2013.01); *G06F 3/14* (2013.01); *B60K 2370/152* (2019.05); *B60K 2370/169* (2019.05)

(58) Field of Classification Search
None
See application file for complete search history.

(56) References Cited

U.S. PATENT DOCUMENTS

2015/0360578 A1* 12/2015 Duan ...................... B60L 58/12
  340/455
2018/0076492 A1* 3/2018 Chaturvedi ......... H01M 10/425

FOREIGN PATENT DOCUMENTS

| JP | 2000-307689 | 11/2000 |
|----|-------------|---------|
| JP | 2004-170231 | 6/2004 |
| JP | 2005-227141 | 8/2005 |
| JP | 2008-083022 | 4/2008 |
| JP | 2011-064571 | 3/2011 |
| JP | 2011-069693 | 4/2011 |
| JP | 2012-242329 | 12/2012 |
| JP | 2014-167450 | 9/2014 |
| JP | 2015-031674 | 2/2015 |

OTHER PUBLICATIONS

Japanese Office Action for Japanese Patent Application No. 2019-150338 dated Apr. 12, 2022.
Japanese Office Action for Japanese Patent Application No. 2019-150338 dated Oct. 11, 2022.

* cited by examiner

*Primary Examiner* — Matthew Yeung
(74) *Attorney, Agent, or Firm* — Amin, Turocy & Watson, LLP

(57) ABSTRACT

A display control apparatus includes: an acquisition part that acquires usage situation information of a battery which stores electric power for traveling of a vehicle; an evaluation part that evaluates a state change amount of the battery based on the usage situation information acquired by the acquisition part; a specifying part that specifies one or more factors of a state change of the battery based on the usage situation information acquired by the acquisition part; and a display control part that allows a display part to display a first image indicating a ratio at which a factor of the state change contributes to the state change amount for each factor of the state change.

8 Claims, 13 Drawing Sheets

| ACQUISITION DATE AND TIME | CHARGE RATE | CHARGE-DISCHARGE CURRENT |
|---|---|---|
| 2018/MM/DD 15:00 | 70% | X1 |
| 2018/MM/DD 15:01 | 68% | X2 |
| ⋮ | ⋮ | ⋮ |
| 2018/MM/DD 15:59 | 22% | X60 |
| 2018/MM/DD 16:00 | 20% | X61 |
| 2018/MM/DD 16:01 | 21% | X62 |
| ⋮ | ⋮ | ⋮ |

| DEGRADATION FACTOR | DEGRADATION CONDITION | WEIGHT |
|---|---|---|
| HIGH TEMPERATURE | AMBIENT TEMPERATURE IS EQUAL TO OR MORE THAN 75°C | 1.5 |
| HIGH TEMPERATURE | SUDDENLY ACCELERATED TRAVELING | 1.3 |
| HIGH TEMPERATURE | STEEPLY ASCENDING TRAVELING | 1.3 |
| LOW TEMPERATURE | AMBIENT TEMPERATURE IS EQUAL TO OR LESS THAN −10°C | 1.2 |
| EXCESS DISCHARGE | BEING LEFT IN STATE WHERE CHARGE RATE IS 0[%] | 1.2 |
| EXCESS CHARGE | BEING LEFT IN STATE WHERE CHARGE RATE IS 100[%] | 1.2 |
| AGING DEGRADATION | CHARGE STATE OF WHICH NUMBER OF TIMES OF CHARGE-DISCHARGE IS EQUAL TO MORE THAN THRESHOLD VALUE | 1.3 |
| AGING DEGRADATION | REGENERATION CHARGE OF WHICH NUMBER OF TIMES OF CHARGE BY REGENERATION IS EQUAL TO OR MORE THAN THRESHOLD VALUE | 1.2 |

| EVALUATION TARGET PERIOD:YYYY/MM/DD |||
|---|---|---|
| DEGRADATION FACTOR | DEGRADATION INDEX (TIME THAT SATISFIES CONDITION * WEIGHT) | RATIO[%] |
| HIGH TEMPERATURE | X | 10 |
| LOW TEMPERATURE | Y | 20 |
| EXCESS DISCHARGE | Z | 70 |

| LIFE EXTENSION FACTOR | LIFE EXTENSION CONDITION | WEIGHT |
|---|---|---|
| ECO-DRIVING | PREDETERMINED TIME ELAPSES SINCE ENGINE RESTARTS | 1.5 |
| | SLOWLY ACCELERATED TRAVELING | 1.3 |
| GOOD TEMPERATURE ENVIRONMENT | AMBIENT TEMPERATURE IS EQUAL TO OR MORE THAN 0°C AND EQUAL TO OR LESS THAN 45°C | 1.5 |
| GOOD USAGE ENVIRONMENT | KEEP STATE WHERE CHARGE RATE IS 80[%] | 1.2 |

DISPLAY CONTROL APPARATUS, DISPLAY CONTROL METHOD, AND PROGRAM

CROSS-REFERENCE TO RELATED APPLICATION

Priority is claimed on Japanese Patent Application No. 2019-150338, filed on Aug. 20, 2019, the contents of which are incorporated herein by reference.

BACKGROUND

Field of the Invention

The present invention relates to a display control apparatus, a display control method, and a program.

Background

In the related art, techniques have been disclosed in which a remaining battery amount and a degradation state of a battery are displayed (for example, refer to Japanese Unexamined Patent Application, First Publication No. 2000-307689 and Japanese Unexamined Patent Application, First Publication No. 2004-170231).

SUMMARY

There are cases in which a user of a device in which a battery is mounted or a user who reuses a battery wishes to understand how the battery has been used so far, the amount of change of the battery state, or a factor causing the changed state. However, in the related art, although it is possible to present the degradation state of the battery, it is difficult to present the factor of the degradation.

An aspect of the present invention is intended to provide a display control apparatus, a display control method, and a program capable of providing detailed information regarding a state change of a battery to a user.

A display control apparatus according to a first aspect of the present invention includes: an acquisition part that acquires usage situation information of a battery which stores electric power for traveling of a vehicle; an evaluation part that evaluates a state change amount of the battery based on the usage situation information acquired by the acquisition part; a specifying part that specifies one or more factors of a state change of the battery based on the usage situation information acquired by the acquisition part; and a display control part that allows a display part to display a first image indicating a ratio at which a factor of the state change contributes to the state change amount for each factor of the state change.

A second aspect of the present invention is the display control apparatus according to the first aspect described above, wherein the display control part may allow the display part to display the first image for each predetermined period of time based on a history of the state change amount evaluated by the evaluation part and a history of the one or more factors of the state change specified by the specifying part.

A third aspect of the present invention is the display control apparatus according to the first or second aspect described above, wherein the display control part may allow the display part to display the first image based on a predetermined factor among the one or more factors of the state change specified by the specifying part.

A fourth aspect of the present invention is the display control apparatus according to any of the first to third aspects described above, wherein the display control part may allow the display part to further display a second image that prompts prevention of degradation of the battery.

A fifth aspect of the present invention is the display control apparatus according to the fourth aspect described above, wherein the display control part may allow the display part to display the second image in a case where an action that prevents degradation of the battery is performed based on the usage situation information.

A display control apparatus according to a sixth aspect of the present invention allows a display part to display a first image indicating a ratio at which a factor of a state change contributes to a state change amount of a battery for each factor of the state change.

A display control method according to a seventh aspect of the present invention includes: by way of a computer, acquiring usage situation information of a battery which stores electric power for traveling of a vehicle; evaluating a state change amount of the battery based on the acquired usage situation information; specifying one or more factors of a state change of the battery based on the acquired usage situation information; and allowing a display part to display a first image indicating a ratio at which a factor of the state change contributes to the state change amount for each factor of the state change.

An eighth aspect of the present invention is a computer-readable non-transitory storage medium that includes a program causing a computer to: acquire usage situation information of a battery which stores electric power for traveling of a vehicle; evaluate a state change amount of the battery based on the acquired usage situation information; specify one or more factors of a state change of the battery based on the acquired usage situation information; and allow a display part to display a first image indicating a ratio at which a factor of the state change contributes to the state change amount for each factor of the state change.

According to the first to eighth aspects described above, it is possible to provide a user with detailed information regarding the state change of the battery.

According to the second aspect described above, it is possible to provide a user with the history regarding the state change of the battery.

According to the third aspect described above, it is possible to present the state change amount of the battery by a factor desired by a user to the user.

According to the fourth to fifth aspects described above, it is possible to prompt a user to prevent degradation of the battery.

BRIEF DESCRIPTION OF THE DRAWINGS

FIG. 3 is a view showing an example of contents of charge-discharge history information.

FIG. 4 is a view showing an example of contents of degradation factor information.

DESCRIPTION OF EMBODIMENTS

Hereinafter, embodiments of a display control apparatus, a display control method, and a program according to the present invention will be described with reference to the drawings.

Overall Configuration

Figure 1:
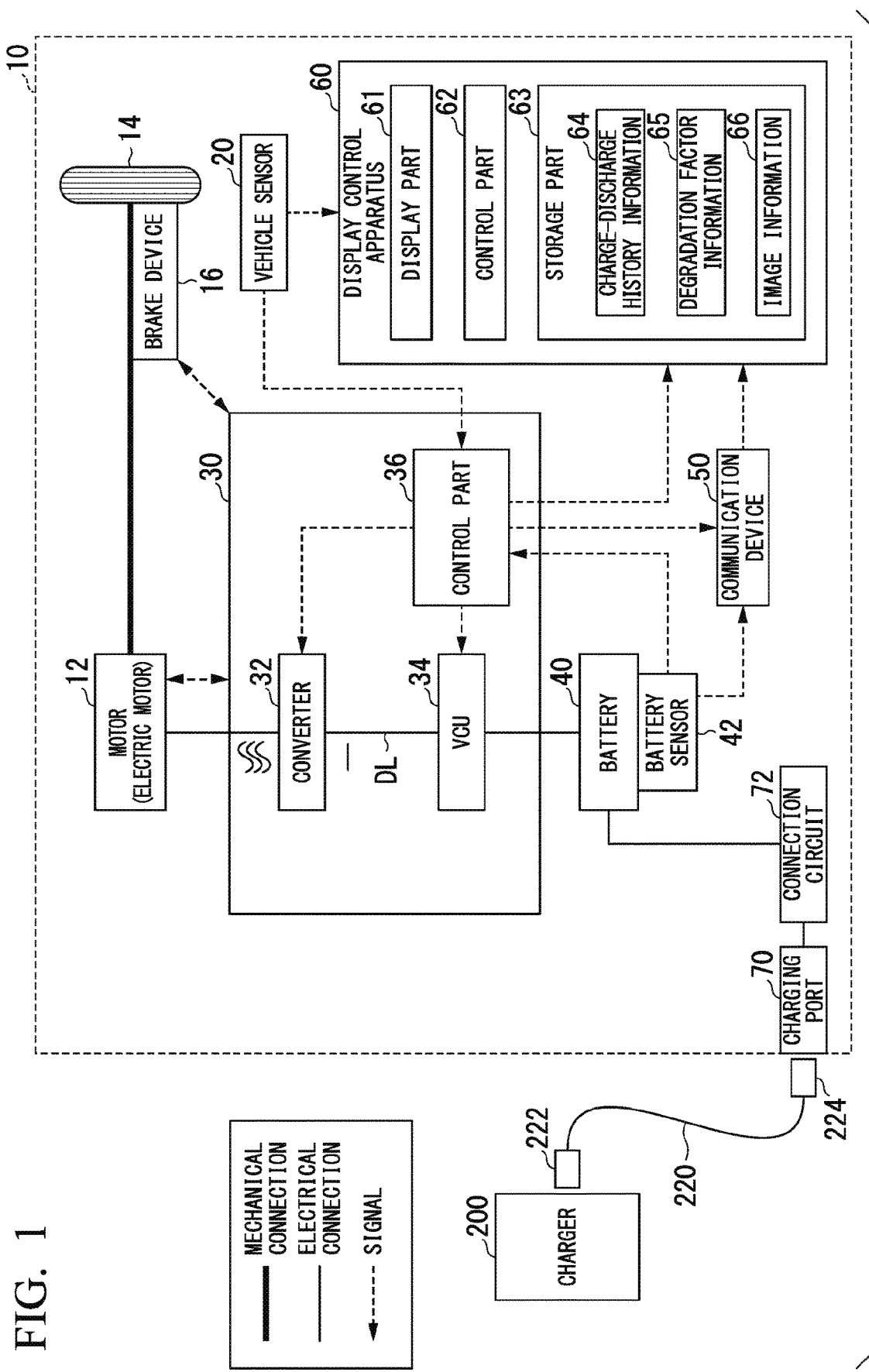
FIG. 1 is a view showing an example of a configuration of a vehicle that includes a display control apparatus according to a first embodiment.

FIG. 1 is a view showing an example of a configuration of a vehicle 10 that includes a display control apparatus 60 according to a first embodiment. As shown in FIG. 1, the vehicle 10 includes, for example, a motor 12, a drive wheel 14, a brake device 16, a vehicle sensor 20, a PCU (Power Control Unit) 30, a battery 40, a battery sensor 42, a communication device 50, a display control apparatus 60, a charging port 70, and a connection circuit 72. The battery sensor 42 includes a sensor such as a voltage sensor, a current sensor, and a temperature sensor.

The motor 12 is, for example, a three-phase alternate current motor. A rotor of the motor 12 is connected to the drive wheel 14. The motor 12 outputs power to the drive wheel 14 using supplied electric power. Further, the motor 12 generates electric power using kinetic energy of a vehicle at the time of deceleration of the vehicle.

The brake device 16 includes, for example, a brake caliper, a cylinder that transmits a hydraulic pressure to the brake caliper, and an electric motor that generates the hydraulic pressure at the cylinder. The brake device 16 may include, as a backup, a mechanism that transmits the hydraulic pressure generated by an operation of a brake pedal to the cylinder via a master cylinder. The brake device 16 is not limited to the configuration described above and may be an electronically controlled hydraulic brake device that transmits the hydraulic pressure of the master cylinder to the cylinder.

The vehicle sensor 20 includes an accelerator opening degree sensor, a vehicle speed sensor, and a brake depression amount sensor. The accelerator opening degree sensor is attached to an accelerator pedal. The accelerator opening degree sensor detects an operation amount of the accelerator pedal and outputs the detected operation amount of the accelerator pedal to the PCU 30 as an accelerator opening degree. The vehicle speed sensor includes, for example, a wheel speed sensor attached to each wheel and a speed calculator. The vehicle speed sensor derives a speed (vehicle speed) of a vehicle by integrating wheel speeds detected by the wheel speed sensor and outputs the derived vehicle speed to the PCU 30. The brake depression amount sensor is attached to the brake pedal. The brake depression amount sensor detects an operation amount of the brake pedal and outputs the detected operation amount of the brake pedal to the PCU 30 as a brake depression amount.

The PCU 30 includes, for example, a converter 32, a VCU (Voltage Control Unit) 34, and a control part 36. An integrated configuration of these components as the PCU 30 is merely an example, and these components may be arranged in a distributed manner.

The converter 32 is, for example, an AC to DC converter. A DC-side terminal of the converter 32 is connected to a direct current link DL. The battery 40 is connected to the direct current link DL via the VCU 34. The converter 32 converts an alternate current generated by the motor 12 into a direct current and outputs the converted direct current to the direct current link DL.

The VCU 34 is, for example, a DC to DC converter. The VCU 34 increases a voltage of electric power supplied from the battery 40 and outputs the electric power having an increased voltage to the direct current link DL.

The control part 36 includes, for example, a motor control portion, a brake control portion, and a battery and VCU control portion. The motor control portion, the brake control portion, and the battery and VCU control portion may be replaced by separate control devices, for example, control devices such as a motor ECU, a brake ECU, and a battery ECU.

The motor control portion of the control part 36 controls the motor 12 on the basis of an output of the vehicle sensor 20. A brake control portion of the control part 36 controls the brake device 16 on the basis of the output of the vehicle sensor 20. The battery and VCU control portion of the control part 36 derives a SOC (State-of-Charge) of the battery 40 on the basis of an output of the battery sensor 42 attached to the battery 40 and outputs the derived SOC to the VCU 34 and the display control apparatus 60. The control part 36 outputs information on a vehicle speed output by the vehicle sensor 20 to the display control apparatus 60. The VCU 34 increases a voltage of the direct current link DL in response to a command from the battery and VCU control portion.

The battery 40 is, for example, a secondary battery such as a lithium ion battery. The battery 40 stores electric power introduced from a charger 200 outside the vehicle 10 and performs discharging for traveling of the vehicle 10. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, voltage value, temperature, and the like to the control part 36.

The control part 36 estimates a degradation degree of the battery 40 and learns a degradation state of the battery 40. For example, the control part 36 derives a current full-charge capacity (hereinafter, referred to as a "current maximum capacity") of the battery 40. The control part 36 derives a maximum capacity ratio of the current maximum capacity to an initial maximum capacity on the basis of the current maximum capacity and the initial maximum capacity. The maximum capacity ratio is an example of information indicating a degradation state of the battery 40. The initial maximum capacity is a full-charge capacity of the battery 40 at the time of shipping (or a rated full-charge capacity of the battery 40).

The control part 36 performs a statistical process such as a clustering process with respect to a derived result such as the full-charge capacity, a ΔSOC, a charging and discharging electric power, and the maximum capacity ratio. Thereby, the control part 36 can learn the degradation state of the battery 40. The control part 36 may derive a degradation degree of the battery 40 on the basis of a value obtained by dividing an integrated value (ΔI[Ah]) of a charging current of the battery 40 between a first time point and a second time point that is different from the first time point after a predetermined period of time elapses by a difference (ΔSOC [%]) between a first charge rate of the battery 40 and a second charge rate of the battery 40.

The control part 36 outputs the derived result to the display control apparatus 60. Further, the control part 36 may derive a usage frequency of the battery 40 and output the derived usage frequency to the display device. The usage frequency may be, for example, a degree of operation (boarding frequency) of the vehicle 10 or may be one that indicates a frequency of charging of the battery 40 or a frequency of discharging.

The communication device 50 includes a wireless module for connecting a cellular network and a Wi-Fi network.

The display control apparatus 60 includes, for example, a display part 61, a control part 62, and a storage part 63.

The display part 61 and the control part 62 are realized, for example, by a hardware processor such as a CPU (Central Processing Unit) executing a program (software). Some or all of these components may be realized by hardware (a circuit part including circuitry) such as a LSI (Large-Scale Integration), an ASIC (Application-Specific Integrated Circuit), a FPGA (Field-Programmable Gate Array), and a GPU (Graphics-Processing Unit) or may be realized by cooperation of software and hardware. The program may be stored in advance in a storage device (non-transitory storage medium) such as a HDD (Hard Disk Drive) or a flash memory such as the storage part 63 or may be stored in a detachable storage medium (non-transitory storage medium) such as a DVD or a CD-ROM and installed by the storage medium being mounted on a drive device.

The display part 61 displays information in accordance with a control of the control part 62. The control part 62 causes the display part 61 to display information based on electric power consumption of the battery 40. The information based on electric power consumption of the battery 40 may be information other than a continuously drivable distance of the vehicle 10 that is, for example, information of a degradation state of the battery 40 or the like.

Figure 2:
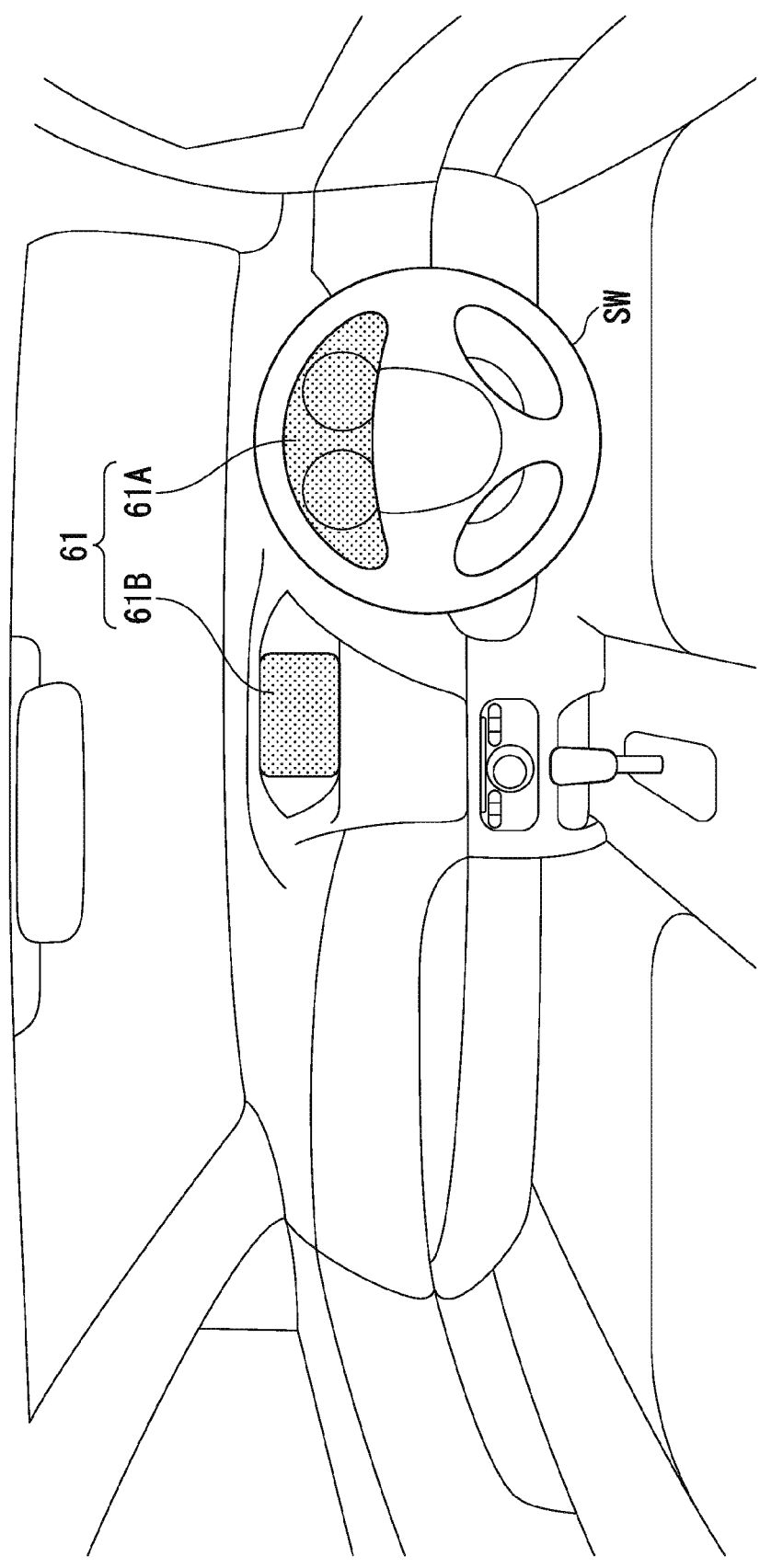
FIG. 2 is a view showing a display part.

FIG. 2 is a view showing the display part 61. The display part 61 includes, for example, a first display portion 61A and a second display portion 61B. The first display portion 61A is a display unit included in a meter box that can be visually recognized by a user seated on a driver's seat at which a steering wheel SW is provided. The second display portion 61B is a display unit that can be visually recognized not only by the user seated on the driver's seat but also by a user seated on a seat other than the driver's seat.

The second display portion 61B may be a display unit included in a HMI (Human Machine Interface) of another in-vehicle device (for example, a navigation device). The same image may be displayed on the first display portion 61A and the second display portion 61B, or an image may be displayed on only one of the first display portion 61A and the second display portion 61B.

With reference back to FIG. 1, the control part 62 evaluates the battery 40 on the basis of various information acquired from the control part 36 and allows the display part 61 to display various images in accordance with the evaluation result. Details of the control part 62 will be described later.

The storage part 63 is realized by, for example, a HDD, a flash memory, an EEPROM, a RAM (Random-Access Memory), or the like. The storage unit 63 stores, for example, information such as charge-discharge history information 64, degradation factor information 65, image information 66, and the like.

FIG. 3 is a view showing an example of contents of the charge-discharge history information 64. The charge-discharge history information 64 is, for example, information including one or more records in which information indicating a charge rate of the battery 40, information indicating a charge-discharge current, and information indicating an acquisition date and time at which the charge rate and the charge-discharge current are acquired (or detected) are associated with each other. The information included in the charge-discharge history information 64 is an example and is not limited thereto. The charge-discharge history information 64 may further include other information acquired by the control part 36 or detected by the battery sensor 42. The charge-discharge history information 64 is an example of "usage situation information".

FIG. 4 is a view showing an example of contents of the degradation factor information 65. The degradation factor information 65 is, for example, information in which information indicating a degradation factor of the battery 40, a degradation condition when degradation due to the degradation factor occurs, and the weight of the degradation condition are associated with each other. The weight of the degradation condition is a value used when the display control apparatus 60 described below evaluates the degradation of the battery 40. The weight of the degradation condition is associated with a larger value as the degradation factor easily contributes to degradation and is associated with a smaller value as the degradation factor does not easily contribute to degradation.

The weight of the degradation condition described above is an example and is not limited thereto. The same weight may be associated with any degradation factor (alternatively, the degradation factor information 65 may not include information regarding the weight of the degradation condition).

The image information 66 includes, for example, data of various images displayed on the display part 61 on the basis of a control of the control part 62.

With reference back to FIG. 1, the charging port 70 is provided toward the outside of a vehicle body of the vehicle 10. The charging port 70 is connected to the charger 200 via a charging cable 220. The charging cable 220 includes a first plug 222 and a second plug 224. The first plug 222 is connected to the charger 200. The second plug 224 is connected to the charging port 70. Electricity supplied from the charger 200 is supplied to the charging port 70 via the charging cable 220.

Further, the charging cable 220 includes a signal cable attached to an electric power cable. The signal cable mediates communication between the vehicle 10 and the charger 200. Accordingly, an electric power connector that connects the electric power cable and a signal connector that connects a signal cable are provided on each of the first plug 222 and the second plug 224.

The connection circuit 72 is provided between the charging port 70 and the battery 40. The connection circuit 72 transmits DC electric power supplied from the charger 200 to the battery 40 via the first plug 222, the charging cable 220, the second plug 224, and the charging port 70. The connection circuit 72 supplies the DC electric power, which is transmitted from the battery 40, to the charger 200 via the charging port 70, the second plug 224, the charging cable 220, and the first plug 222.

Regarding Control Part 62

Figures 5, 6:
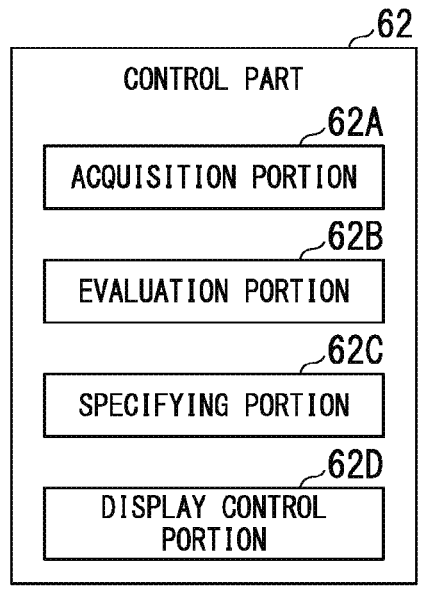
FIG. 5 is a view showing an example of a configuration of a control part included in a display control apparatus.
FIG. 6 is a view showing an example of contents of degradation-specifying information.

The control part 62 is described in detail below. FIG. 5 is a view showing an example of a configuration of the control part 62 included in the display control apparatus 60. The control part 62 includes, for example, an acquisition portion 62A, an evaluation portion 62B, a specifying portion 62C, and a display control portion 62D.

The acquisition portion 62A acquires information (for example, a degradation state of the battery 40) regarding the battery 40 acquired by the control part 36 and information indicating a detection result of the battery 40 detected by the battery sensor 42 from the control part 36 continuously or at a predetermined time interval. The acquisition portion 62A generates a record of the charge-discharge history information 64 on the basis of the acquired information and generates (updates) the charge-discharge history information 64.

The above embodiment is described using a case in which the control part 36 derives (acquires) various information regarding the battery 40 on the basis of the detection result of the battery sensor 42 and outputs the information to the display control apparatus 60; however, the embodiment is not limited thereto. For example, instead of the control part 36, the control part 62 may include a functional unit that derives various information regarding the battery 40 on the basis of the detection result of the battery sensor 42. In this case, the control part 36 outputs only the detection result of the battery sensor 42 to the control part 62. The functional unit included in the control part 62 derives various information regarding the battery 40 on the basis of the detection result of the battery sensor 42 acquired by the acquisition portion 62A.

The evaluation portion 62B evaluates a degradation amount of the battery 40 on the basis of the charge-discharge history information 64.

The evaluation portion 62B extracts, for example, records in an evaluation target period (for example, one day) of the charge-discharge history information 64. Then, the evaluation portion 62B compares a current maximum capacity of the newest record with a current maximum capacity of the oldest record among the extracted records and derives a degradation amount at which the battery 40 degrades in the evaluation target period. The degradation amount is, for example, a capacity obtained by subtracting the current maximum capacity of the newest record from the current maximum capacity of the oldest record. The derivation of the degradation amount by the evaluation portion 62B is an example of "evaluating a state change amount of the battery".

The specifying portion 62C specifies one or more degradation factors by which the battery 40 is degraded by a degradation amount derived by the evaluation portion 62B on the basis of the charge-discharge history information 64 and the degradation factor information 65. First, the specifying portion 62C extracts the records in the evaluation target period of the charge-discharge history information 64.

The specifying portion 62C determines whether or not there is a record that satisfies a degradation condition included in the degradation factor information 65 among the extracted records. The specifying portion 62C specifies a degradation factor associated with the degradation condition as a factor by which the battery 40 is degraded in a case where there is a record that satisfies the degradation condition.

Further, the specifying portion 62C derives a ratio at which the specified degradation factor contributes to the degradation of the degradation amount derived by the evaluation portion 62B for each degradation factor. First, the specifying portion 62C specifies, for example, a record that satisfies the degradation condition among the extracted records in the evaluation target period on the basis of the degradation factor information 65 and specifies a total time that satisfies the degradation condition in the evaluation target period on the basis of the specified record. Next, the specifying portion 62C calculates a value obtained by multiplying the specified total time by a weight corresponding to the degradation factor as a degradation index of the degradation factor. Then, the specifying portion 62C calculates the sum of calculated degradation indices for each degradation factor and calculates a ratio of the degradation index to the calculated sum as a ratio at which the specified degradation factor contributes. The specifying portion 62C generates degradation-specifying information on the basis of the specified and acquired information.

FIG. 6 is a view showing an example of contents of the degradation-specifying information. The degradation-specifying information is, for example, information in which information indicating the degradation factor of the battery 40, information indicating the degradation index, and information indicating the ratio are associated with each other for each evaluation target period. In FIG. 6, the evaluation target period is one day of "YYYY/MM/DD", and the specifying portion 62C specifies "high temperature", "low temperature", and "excess discharge" as the degradation factor by which the battery 40 is degraded in the evaluation target period. The specifying portion 62C calculates a degradation index "X" obtained by multiplying the total time that satisfies the degradation condition of the "high temperature" in the evaluation target period by the weight of "1.5". The specifying portion 62C calculates a degradation index "Y" obtained by multiplying the total time that satisfies the degradation condition of the "low temperature" in the evaluation target period by the weight of "1.2". The specifying portion 62C calculates a degradation index "Z" obtained by multiplying the total time that satisfies the degradation condition of the "excess discharge" in the evaluation target period by the weight of "1.2". The specifying portion 62C calculates 10 [%] as a ratio of the degradation index "X" to the sum of the degradation indices. The specifying portion 62C calculates 20 [%] as a ratio of the degradation index "Y" to the sum of the degradation indices. The specifying portion 62C calculates 70 [%] as a ratio of the degradation index "Z" to the sum of the degradation indices. Then, the specifying portion 62C associates the specified and acquired information with the evaluation target period and generates the degradation-specifying information.

The above embodiment is described using a case in which the specifying portion 62C derives the ratio at which the specified degradation factor contributes for each degradation factor on the basis of the degradation index; however, the embodiment is not limited thereto. The specifying portion 62C may specify, for example, the ratio at which the specified degradation factor contributes for each degradation factor on the basis of a table in which a time during which the degradation factor occurs and the ratio of each degradation factor are associated with each other. The specifying portion 62C may use a learning model which has been learned to input the charge-discharge history information 64 and output a factor (in this case, a degradation factor) of the state change of the battery 40 and the ratio at which a factor of the state change contributes to the state change. In this case, the specifying portion 62C inputs the charge-discharge history information 64 in the evaluation target period to the learning model and acquires, as the output of the learning model, the factor of the state change and the ratio at which the factor of the state change contributes to the state change.

With reference back to FIG. 5, the display control portion 62D allows the display part 61 (for example, the second display portion 61B) to display various images regarding the degradation of the battery 40 in response to a command of a user or at a predetermined time interval. Hereinafter, details of the image displayed by the display control portion 62D are described.

Regarding First Image IM1

Figure 7:
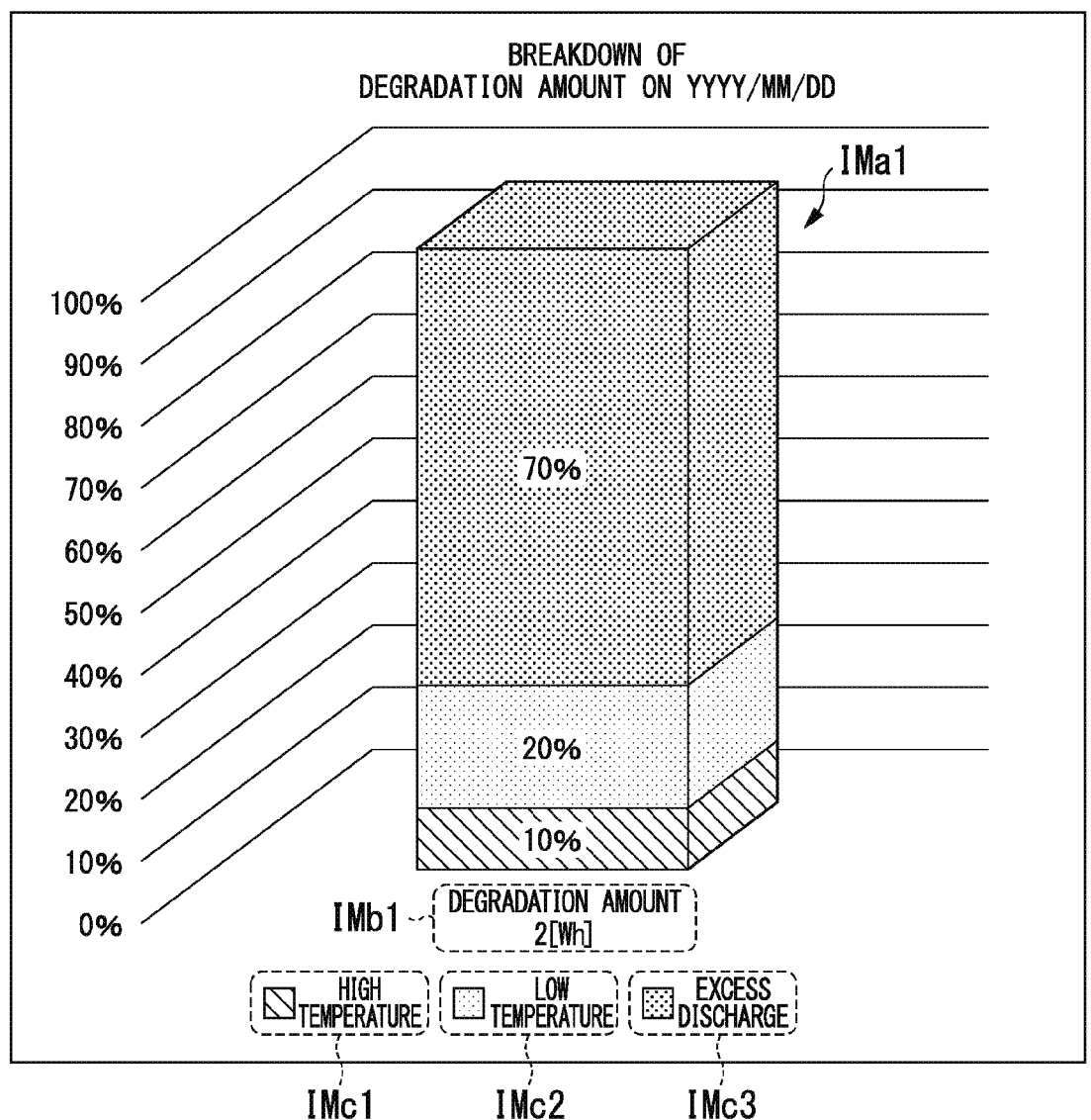
FIG. 7 is a view showing an example of a first image.

FIG. 7 is a view showing an example of a first image IM1. The display control portion 62D generates a first image IM1 indicating a ratio at which the specified degradation factor contributes to the degradation of the degradation amount derived by the evaluation portion 62B for each degradation factor on the basis of the degradation-specifying information generated by the specifying portion 62C and allows the display part 61 to display the first image IM1. The first image IM1 includes, for example, a graph image IMa1, a degradation amount image IMb1, and a degradation factor image IMc (degradation factor images IMc1 to IMc3 are shown in the drawing). The graph image IMa1 is an image of a graph showing the ratio calculated by the specifying portion 62C for each degradation factor. The degradation amount image IMb1 is an image indicating a degradation amount (2 [Wh] in the drawing) derived by the evaluation portion 62B. The degradation factor image IMc1 is an image indicating the "high temperature", which is one of the degradation factors specified by the specifying portion 62C. The degradation factor image IMc2 is an image indicating the "low temperature", which is one of the degradation factors specified by the specifying portion 62C. The degradation factor image IMc3 is an image indicating the "excess discharge", which is one of the degradation factors specified by the specifying portion 62C.

The display control portion 62D selects a graph image IMa, a degradation amount image IMb, and a degradation factor image IMc that correspond to the degradation-specifying information from the image information 66 on the basis of the degradation-specifying information generated by the specifying portion 62C. Then, the display control portion 62D generates the first image IM1 that includes the selected image, and allows the display part 61 to display the first image IM1. Thereby, the display control apparatus 60 of the present embodiment can make the detailed information regarding the state change (in this case, degradation) of the battery 40 to be the first image IM1 that is visually understandable and provide a user with the first image IM1.

The above embodiment is described using a case in which the first image IM1 is an image generated on the basis of the evaluation target period of one day; however, the embodiment is not limited to thereto. The evaluation portion 62B, the specifying portion 62C, and the display control portion 62D may acquire various information on the basis of a record in a predetermined period (for example, one week, one month, one year, a period from the start of operation of the battery 40 until now, and the like) of the charge-discharge history information 64 and generate the first image IM1. The predetermined period may be assigned, for example, by a user riding on the vehicle 10 in advance, or may be assigned by an input of a user to a HMI provided on the vehicle 10.

Accordingly, the display control apparatus 60 of the present embodiment can provide the user with a history of the state change (in this case, degradation) of the battery 40 by generating an image on the basis of the record of the predetermined period (for example, one week, one month, one year, a period from the start of operation of the battery 40 until now, and the like). The display control apparatus 60 may display the first images IM1 at a predetermined period to be aligned. For example, the display control apparatus 60 generates the first images IM1 at a predetermined period (for example, one month) and allows the display part 61 to display the first images IM1 in an aligned manner. Thereby, the display control apparatus 60 of the present embodiment can provide the user with the history of the state change (in this case, degradation) of the battery 40.

Regarding Second Image IM2

Figure 8:
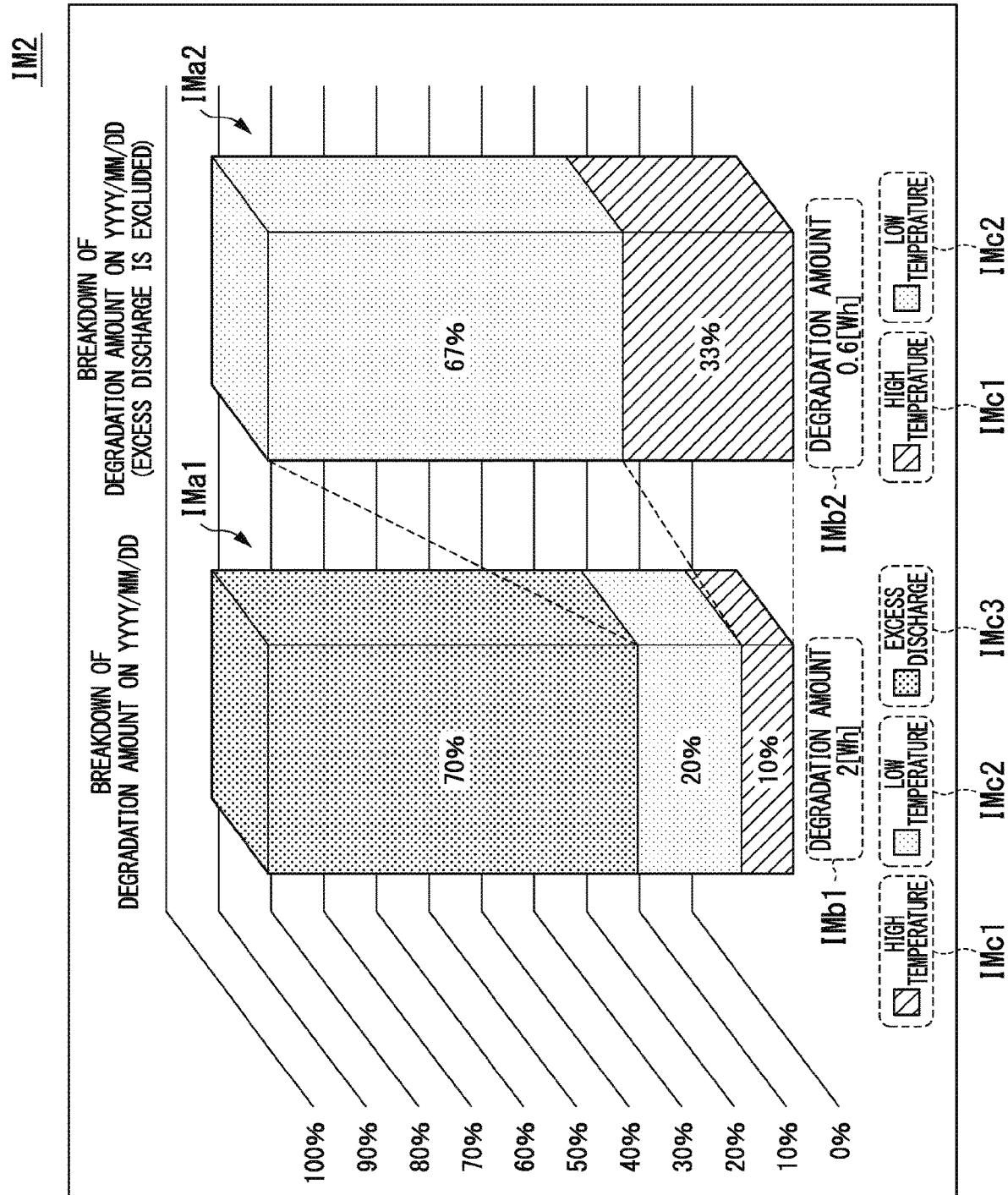
FIG. 8 is a view showing an example of a second image.

FIG. 8 is a view showing an example of a second image IM2. The display control portion 62D may generate a second image IM2 on the basis of a predetermined factor (the "high temperature" and the "low temperature" in the drawing) among one or more degradation factors (in this example, the "high temperature", the "low temperature", and the "excess discharge") specified by the specifying portion 62C and allow the display part 61 to display the second image IM2. When generating the second image IM2, the specifying portion 62C calculates the ratio by subtracting the degradation index regarding a degradation factor (in this case, the "excess discharge") other than the predetermined factor from the sum of the degradation indices and generates the degradation-specifying information. The predetermined factor (or a degradation factor other than the predetermined factor) may be selected by a user or may be arbitrarily selected by the display control portion 62D. In the following description, the predetermined factor is selected by the user. The process of the display control portion 62D that generates the second image IM2 including the graph image IMa, the degradation amount image IMb, and the degradation factor image IMc on the basis of the degradation-specifying information regarding the degradation factor other than the predetermined factor is similar to the process that generates the first image IM1, and therefore, the explanation thereof is omitted. The second image IM2 is an example of a "first image".

The second image IM2 includes, for example, graph images IMa1 to IMa2, degradation amount images IMb1 to IMb2, and a degradation factor image IMc (degradation factor images IMc1 to IMc3 shown in the drawing). The graph image IMa2 is an image of a graph showing the ratio calculated by subtracting the degradation index regarding the degradation factor (in this case, the "excess discharge") other than the predetermined factor from the total of the degradation indices for each degradation factor. The degradation amount image IMb2 is an image indicating a value (0.6 [Wh] in the drawing) obtained by subtracting the degradation amount of the ratio occupied by the degradation factor (in this case, the "excess discharge") other than the predetermined factor from the degradation amount derived by the evaluation portion 62B.

Here, in a case where a user of the vehicle 10 happens to generate a degradation factor that does not occur in a normal use method or the like, even when the first image IM1 is referred to, there may be cases in which it is impossible to appropriately check the degradation factor that occurs in the normal use method due to the impact of the degradation factor that happens to occur. According to the display control apparatus 60 of the present embodiment, it is possible to make the detailed information regarding the state change (in this case, degradation) of the battery 40 to be in a visually understandable form using the second image IM2 relating to a predetermined factor and provide a user with the information.

The above embodiment is described using a case in which the display control portion 62D selects the graph image IMa, the degradation amount image IMb, and the degradation factor image IMc included in the image information 66 and generates the first image IM1 and the second image IM2; however, the embodiment is not limited thereto. The image information 66 may include, for example, various first images IM1 and second images IM2, and the display control portion 62D may select a corresponding first image IM1 or a corresponding second image IM2 from the image information 66 on the basis of the degradation-specifying information. In this case, the display control portion 62D does not perform a process of generating the first image IM1 or the second image IM2.

Modified Example 1

Hereinafter, modified example 1 of the above embodiment is described with reference to the drawings. The embodiment is described using a case in which information indicating the state change regarding the degradation of the battery 40 is provided to the user using the first image IM1 or the second image IM2. Modified example 1 is described using a case of providing a user with an image that prompts a life extension of the battery 40. A configuration similar to that of the embodiment described above is given by the same reference numerals, and description thereof is omitted.

Figures 9, 10:
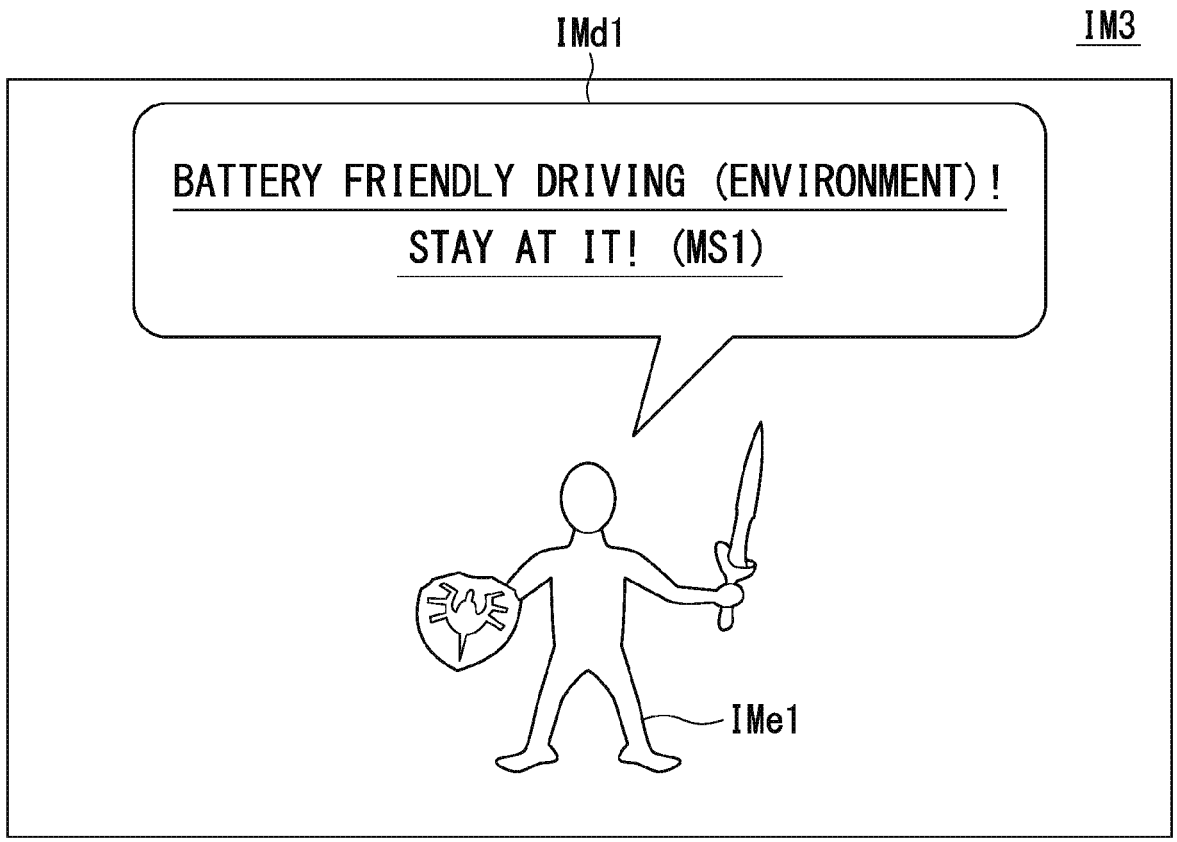
FIG. 9 is a view showing an example of the contents of life extension factor information.
FIG. 10 is a view showing an example of a third image.

FIG. 9 is a view showing an example of the contents of life extension factor information 67. The life extension factor information 67 is stored in the storage part 63 of modified example 1. The life extension factor information 67 is, for example, information in which information indicating a factor (hereinafter, referred to as a life extension factor) by which the life of the battery 40 can be extended (that is, such that degradation does not occur in the battery 40), information indicating a life extension condition in which the life of the battery 40 can be extended by the life extension factor (that is, which prevents the degradation of the battery 40), and information indicating the weight of the life extension condition are associated with one another. The weight of the life extension condition is a value used when the display control apparatus 60 evaluates the degree of life extension of the battery 40. The weight of the life extension condition is associated with a larger value as the life extension factor easily contributes to life extension and is associated with a smaller value as the life extension factor does not easily contribute to life extension.

The evaluation portion 62B of modified example 1 evaluates (derives) the life extension amount of the battery 40 on the basis of the charge-discharge history information 64. The life extension amount is, for example, a capacity obtained by subtracting a degradation amount by which the battery 40 is degraded in an evaluation target period from a reference degradation amount by which the battery 40 is estimated to be normally degraded in the evaluation target period. A case where the life extension amount indicates a positive value shows that the life of the battery 40 can be more extended than usual. A case where the life extension amount indicates a negative value shows that the battery 40 is more degraded than usual. The derivation of the life extension amount by the evaluation portion 62B is an example of "evaluating a state change amount of a battery".

The specifying portion 62C of modified example 1 specifies one or more factors for which the life of the battery 40 is extended by the life extension amount evaluated by the evaluation portion 62B on the basis of the charge-discharge history information 64 and the life extension factor information 67. Since a process in which the specifying portion 62C specifies the life extension factor on the basis of the charge-discharge history information 64 and the life extension factor information 67 is a process similar to the process of specifying the degradation factor on the basis of the charge-discharge history information 64 and the degradation factor information 65, description thereof is omitted.

Regarding Third Image IM3

FIG. 10 is a view showing an example of a third image IM3. The display control portion 62D of modified example 1 allows the display part 61 to display the third image IM3 in a case where a life extension factor is specified by the specifying portion 62C (that is, in a case where an action that prevents degradation of the battery 40 is performed). The third image IM3 is, for example, an image that prompts a user to prevent degradation of the battery 40. The third image IM3 includes, for example, a message image IMd1 indicating a message that prompts the user to prevent the degradation of the battery 40 and an image (a character image IMe1 as shown in the drawing) that provides the user with a motivation for preventing the degradation of the battery 40. The message image IMd1 includes, for example, a message MS1 such as "Battery friendly driving (environment)! Stay at it". The character image IMe1 shows a character that grows up (is updated) in response to an action that prevents the degradation of the battery 40. The third image, and the message image IMd and the character image IMe included in the third image IM3 are examples of a "second image".

Regarding Fourth Image IM4

Figure 11:
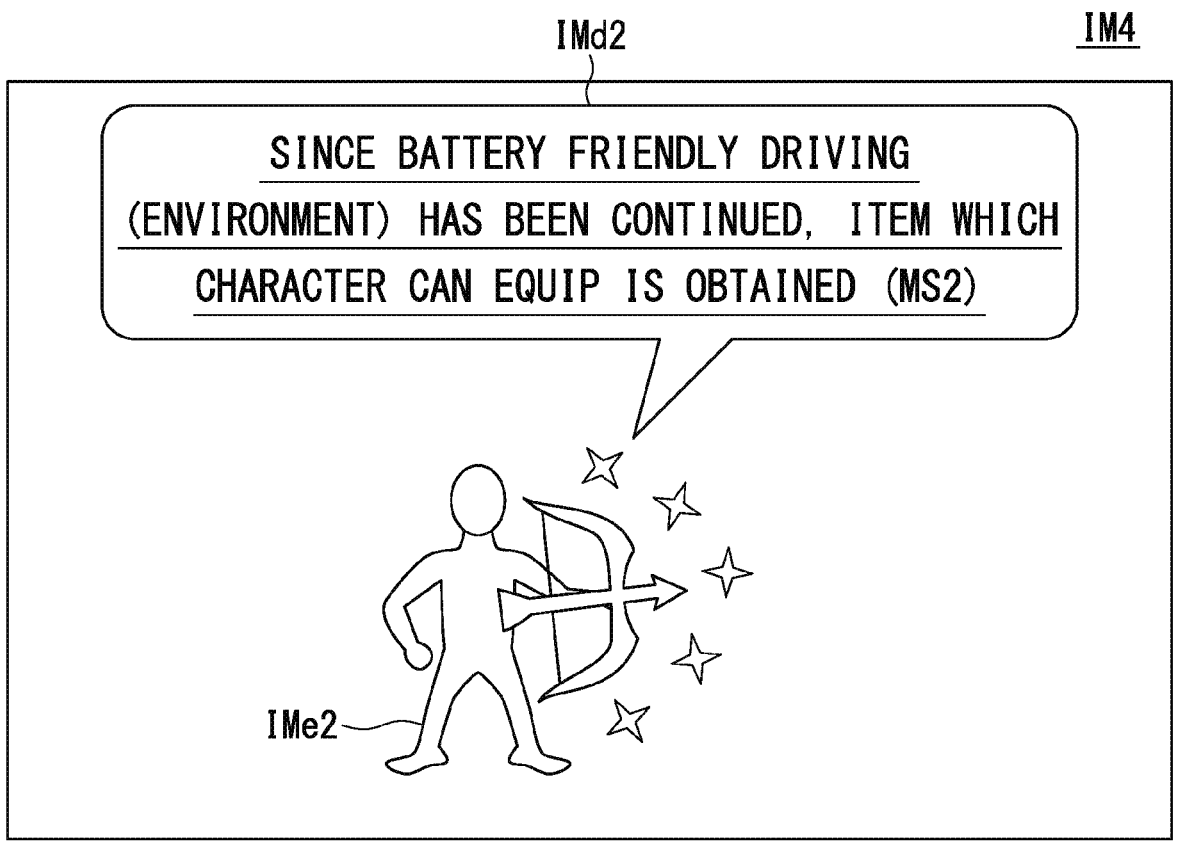
FIG. 11 is a view showing an example of a fourth image.

FIG. 11 is a view showing an example of a fourth image IM4. The display control portion 62D of modified example 1 may update the character image IMe as the life extension factor is specified by the specifying portion 62C (that is, as an action that prevents degradation of the battery 40 is performed). The display control portion 62D allows the display part 61 to display the fourth image IM4, for example, whenever a time that satisfies the life extension condition by the specifying portion 62C is equal to or more than a predetermined threshold value. The fourth image IM4 includes a message image IMd2 and a character image IMe2. The message image IMd2 includes, for example, a message MS2 such as "since battery friendly driving (environment) has been continued, an item which the character can equip is obtained", which is a message indicating that a life extension factor is specified (that is, an action that prevents degradation of the battery 40 is performed). The character image IMe2 shows an item that will be given to the character of the character image IMe1 hereafter. The item shown in the character image IMe2 may be different from the item included in the fourth image IM4 previously displayed on the display part 61. The character image IMe2 is displayed, for example, hereafter, in a situation where the third image IM3 is displayed, such that the character image IMe2 together with the character image IMe1 appears to be possessed by the character indicated by the character image IMe1. By allowing the display part 61 to display the third image IM3 or the fourth image IM4, the display control apparatus 60 of modified example 1 can prompt the user to extend the life of the battery 40.

Modified Example 2

Hereinafter, modified example 2 of the above embodiment is described with reference to the drawings. Modified example 2 is described using a case of providing a user with information indicating a state change regarding life extension of the battery 40 using an image. A configuration similar to that of the embodiment described above is given by the same reference numerals, and description thereof is omitted.

The specifying portion 62C of modified example 2 derives a ratio at which the specified life extension factor contributes to the life extension of the battery 40 of the life extension amount derived by the evaluation portion 62B in modified example 1 for each life extension factor. First, the specifying portion 62C specifies, for example, a record that satisfies the life extension condition among the extracted records in the evaluation target period on the basis of the life extension factor information 67 and specifies a total time that satisfies the life extension condition in the evaluation target period on the basis of the specified record. Next, the specifying portion 62C calculates a value obtained by multiplying the specified total time by a weight corresponding to the life extension factor as a life extension index of the life extension factor. Then, the specifying portion 62C calculates the sum of calculated life extension indices for each life extension factor and calculates a ratio of the life extension index to the calculated sum as a ratio at which the specified life extension factor contributes. The specifying portion 62C generates life extension-specifying information on the basis of the specified and acquired information.

Regarding Fifth Image IM5

Figure 12:
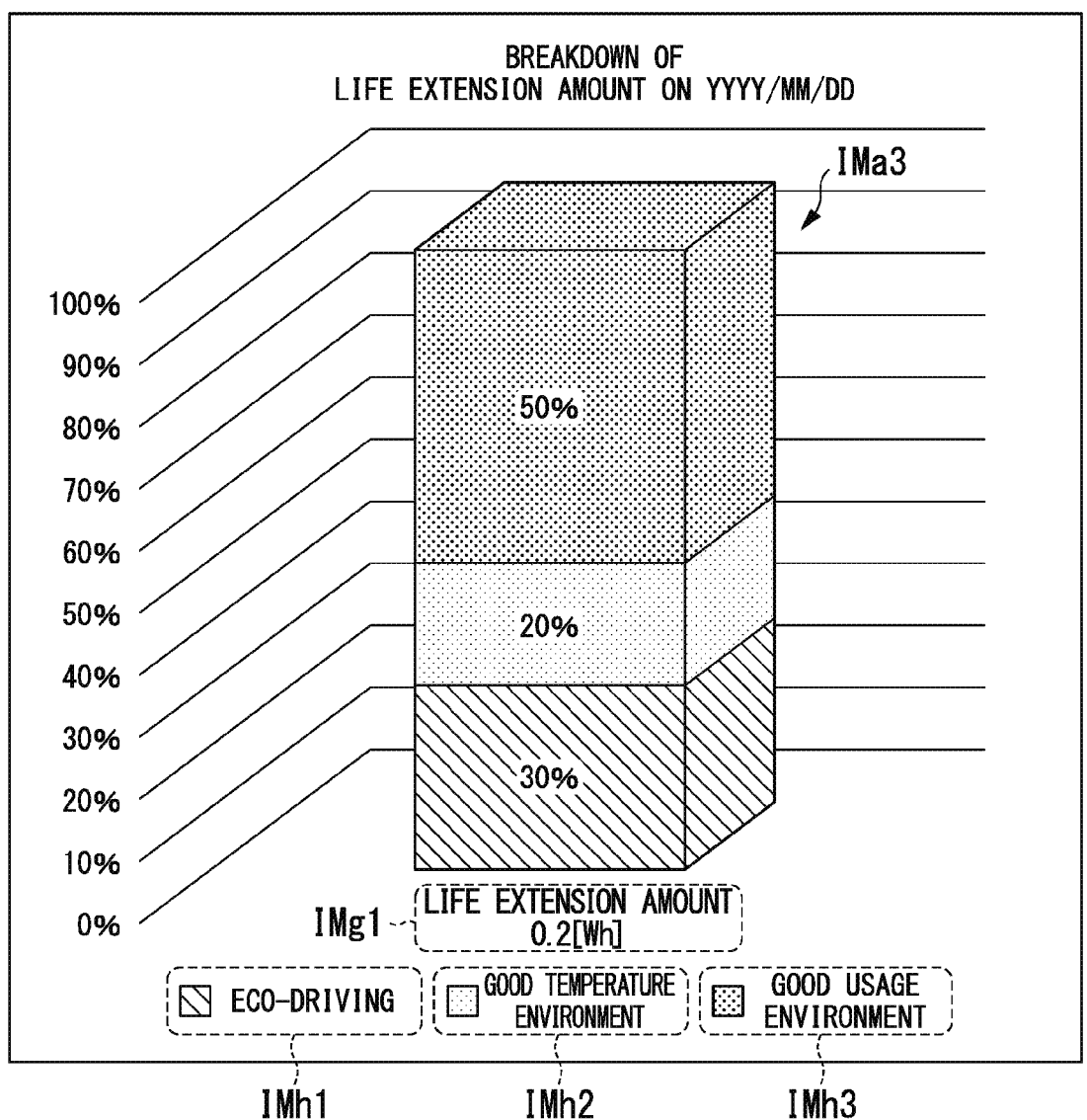
FIG. 12 is a view showing an example of a fifth image.

FIG. 12 is a view showing an example of a fifth image IM5. The display control portion 62D of modified example 2 generates a fifth image IM5 indicating a ratio at which the specified life extension factor contributes to the life extension of the battery 40 of the life extension amount derived by the evaluation portion 62B for each life extension factor on the basis of the life extension-specifying information generated by the specifying portion 62C and allows the display part 61 to display the fifth image IM5. The fifth image IM5 includes, for example, a graph image IMa1, a life extension amount image IMg1, and a life extension factor image IMh (life extension factor images IMh1 to IMh3 are shown in the drawing). The graph image IMa3 is an image of a graph showing the ratio calculated by the specifying portion 62C for each life extension factor. The life extension amount image IMg1 is an image indicating a life extension amount (0.2 [Wh] in the drawing) derived by the evaluation portion 62B. The life extension factor image IMh1 is an image indicating "eco-driving", which is one of the life extension factors specified by the specifying portion 62C. The life extension factor image IMh2 is an image indicating "good temperature environment", which is one of the life extension factors specified by the specifying portion 62C. The life extension factor image IMh3 is an image indicating "good usage environment", which is one of the life extension factors specified by the specifying portion 62C.

The display control portion 62D selects a graph image IMa, a life extension amount image IMg, and a life extension factor image IMh that correspond to the life extension-specifying information from the image information 66 on the basis of the life extension-specifying information generated by the specifying portion 62C. Then, the display control portion 62D generates the fifth image IM5 that includes the selected image, and allows the display part 61 to display the fifth image IM5. Thereby, the display control apparatus 60 of the present embodiment can make the detailed information regarding the state change (in this case, life extension) of the battery 40 to be the fifth image IM5 that is visually understandable and provide a user with the fifth image IM5.

The display control portion 62D may generate an image on the basis of a predetermined factor among one or more life extension factors (in this example, "eco-driving", "good temperature environment", and "good usage environment") specified by the specifying portion 62C and allow the display part 61 to display the image. A process of generating an image on the basis of a predetermined factor among one or more specified life extension factors is similar to the process regarding generation of the second image IM2 described above, and therefore, the explanation thereof is omitted.

Operation Flow

Figure 13:
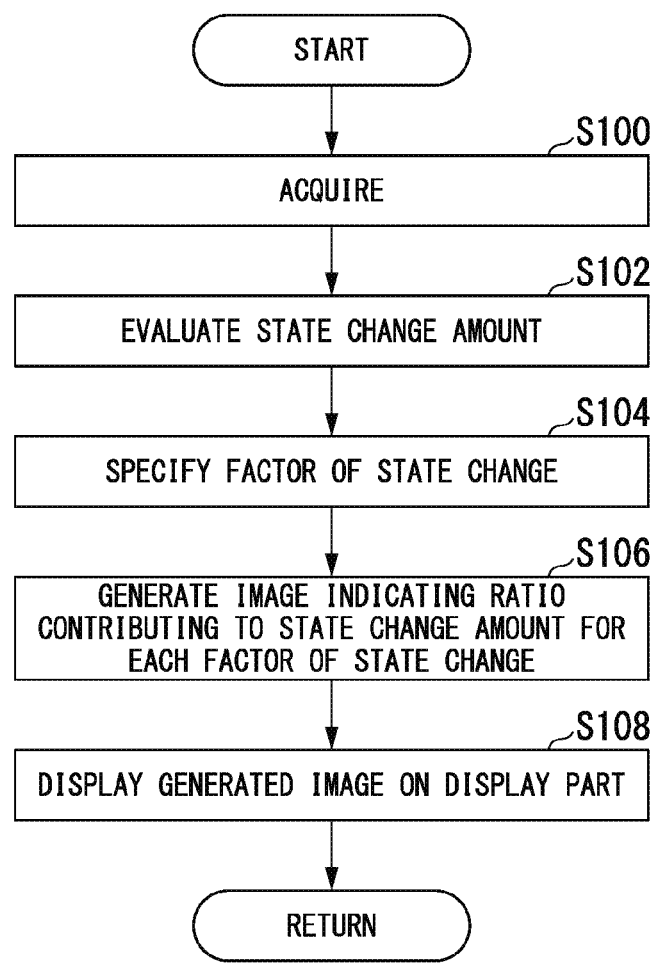
FIG. 13 is a flowchart showing an example of a series of operations of the display control apparatus.

FIG. 13 is a flowchart showing an example of a series of operations of the display control apparatus 60. First, the acquisition portion 62A acquires information (for example, a degradation state of the battery 40) regarding the battery 40 acquired by the control part 36 and information indicating a detection result of the battery 40 detected by the battery sensor 42 from the control part 36 continuously or at a predetermined time interval and generates the charge-discharge history information 64 (Step S100). The evaluation portion 62B evaluates (derives) the state change amount (for example, the degradation amount or the life extension amount) of the battery 40 on the basis of the information (that is, the charge-discharge history information 64) acquired by the acquisition portion 62A (Step S102). Next, the specifying portion 62C specifies a factor (for example, the degradation factor or the life extension factor) by which the state of the battery 40 is changed by a state change amount derived by the evaluation portion 62B on the basis of the charge-discharge history information 64 and the degradation factor information 65 (Step S104). Specifically, the specifying portion 62C derives a ratio at which the specified factor contributes to the state change of the state change amount derived by the evaluation portion 62B for each factor.

Next, the display control portion 62D generates an image (for example, the first image IM1, the second image IM2, the fifth image IM5, or the like) indicating a ratio at which the factor specified by the specifying portion 62C contributes to the state change of the state change amount derived by the evaluation portion 62B for each factor (Step S106). The control part 62 may select a corresponding image from the image information 66 instead of the configuration of generating an image. The display control portion 62D allows the display part 61 to display the generated image (Step S108).

In the flowchart shown in FIG. 13, the display control apparatus 60 may perform a process only with respect to any one of degradation and life extension among the state changes of the battery 40 or may perform the process with respect to both of degradation and life extension. In a case of generating an image with respect to each of both state changes of degradation and life extension, the display control portion 62D may allow the display part 61 to sequentially display the images.

Figure 14:
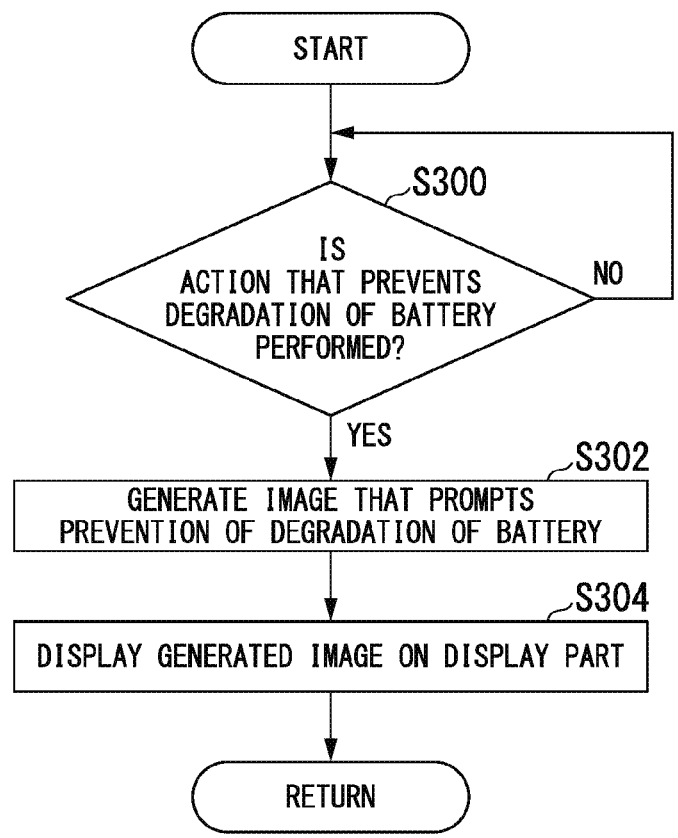
FIG. 14 is a flowchart showing an example of a process that prompts prevention of degradation of a battery.

FIG. 14 is a flowchart showing an example of a process that prompts prevention of degradation of a battery. First, the specifying portion 62C determines whether or not a life extension factor is specified (that is, whether an action that prevents degradation of the battery 40 is performed) on the basis of the charge-discharge history information 64 and the life extension factor information 67 (Step S300). In a case where it is determined that a life extension factor is specified by the specifying portion 62C, the display control portion 62D generates an image (for example, the third image IM3, the fourth image IM4, or the like) that prompts prevention of degradation of the battery (Step S302). The control part 62 may select a corresponding image from the image information 66 instead of the configuration of generating an image. The display control portion 62D allows the display part 61 to display the generated image (Step S304).

Another Example of Storage Part that Stores Charge-Discharge History Information 64

The above embodiment is described using a case in which the charge-discharge history information 64 is stored in the storage part 63 included in the display control apparatus 60; however, the embodiment is not limited thereto. The charge-discharge history information 64 may be stored, for example, in a storage part (not shown) included in the battery 40. In this case, the control part 62 generates various images (the first image IM1, the second image IM2, the third image IM3, the fourth image IM4, the fifth image IM5, or the like) on the basis of the charge-discharge history information 64 stored in the battery 40. The battery 40 may be removed from the vehicle 10 and used (reused) in another vehicle or another device. In this case, the display control portion 62D generates various images on the basis of the charge-discharge history information 64 stored in the storage part of the battery 40 and allows the display part 61 to display the images, and thereby, it is possible to provide a user with detailed information regarding the state change of the battery 40 before the battery 40 is reused.

Another Example of Storage Part that Stores Various Images

Further, the above embodiment is described using a case in which the display control portion 62D generates various images regarding the factor of the state change and the state change amount acquired by the evaluation portion 62B or the specifying portion 62C and allows the display part 61 to display the images; however, the embodiment is not limited thereto. The display control portion 62D may generate an image (the first image IM1, the second image IM2, the fifth image IM5, and the like) regarding the state change of the battery 40 continuously or at a predetermined time interval and store information indicating the generated image in the storage part (not shown) included in the battery 40. In this case, a display control portion 62D of a display control apparatus 60 mounted on a reuse device that uses the battery 40 in which the information indicating the image is stored allows the display part 61 to display the image regarding the state change of the battery 40 on the basis of the information indicating the image stored in the battery 40, and thereby, it is possible to provide a user with detailed information regarding the state change of the battery 40 before the battery 40 is reused.

Second Embodiment

Hereinafter, a second embodiment is described with reference to the drawings. The first embodiment is described using a case in which information regarding the degradation of the battery 40 is provided to the user. The second embodiment is described using a case in which information regarding degradation of a FC (Fuel Cell) system is provided to the user. A configuration similar to that of the embodiment and modified examples described above is given by the same reference numerals, and description thereof is omitted.

Overall Configuration

Figure 15:
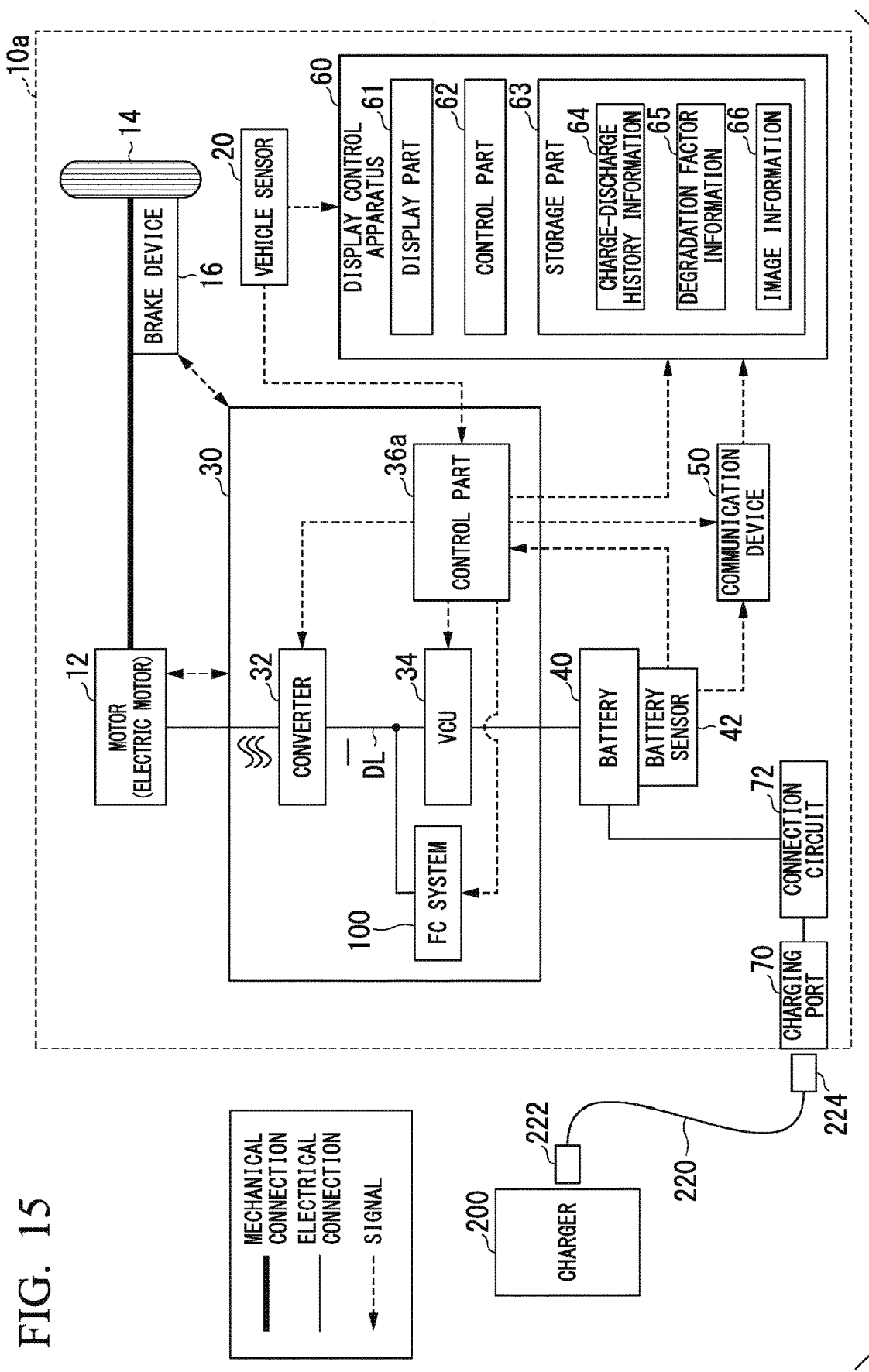
FIG. 15 is a view showing an example of a configuration of a vehicle that includes a display control apparatus according to a second embodiment.

FIG. 15 is a view showing an example of a configuration of a vehicle 10a that includes a display control apparatus 60 according to the second embodiment. As shown in FIG. 15, the vehicle 10a according to the second embodiment includes a FC system 100 in addition to (alternatively, in place of the battery 40) the configuration provided on the vehicle 10. The vehicle 10a includes a control part 36a in place of (alternatively, in addition to) the control part 36.

FC System 100

Figure 16:
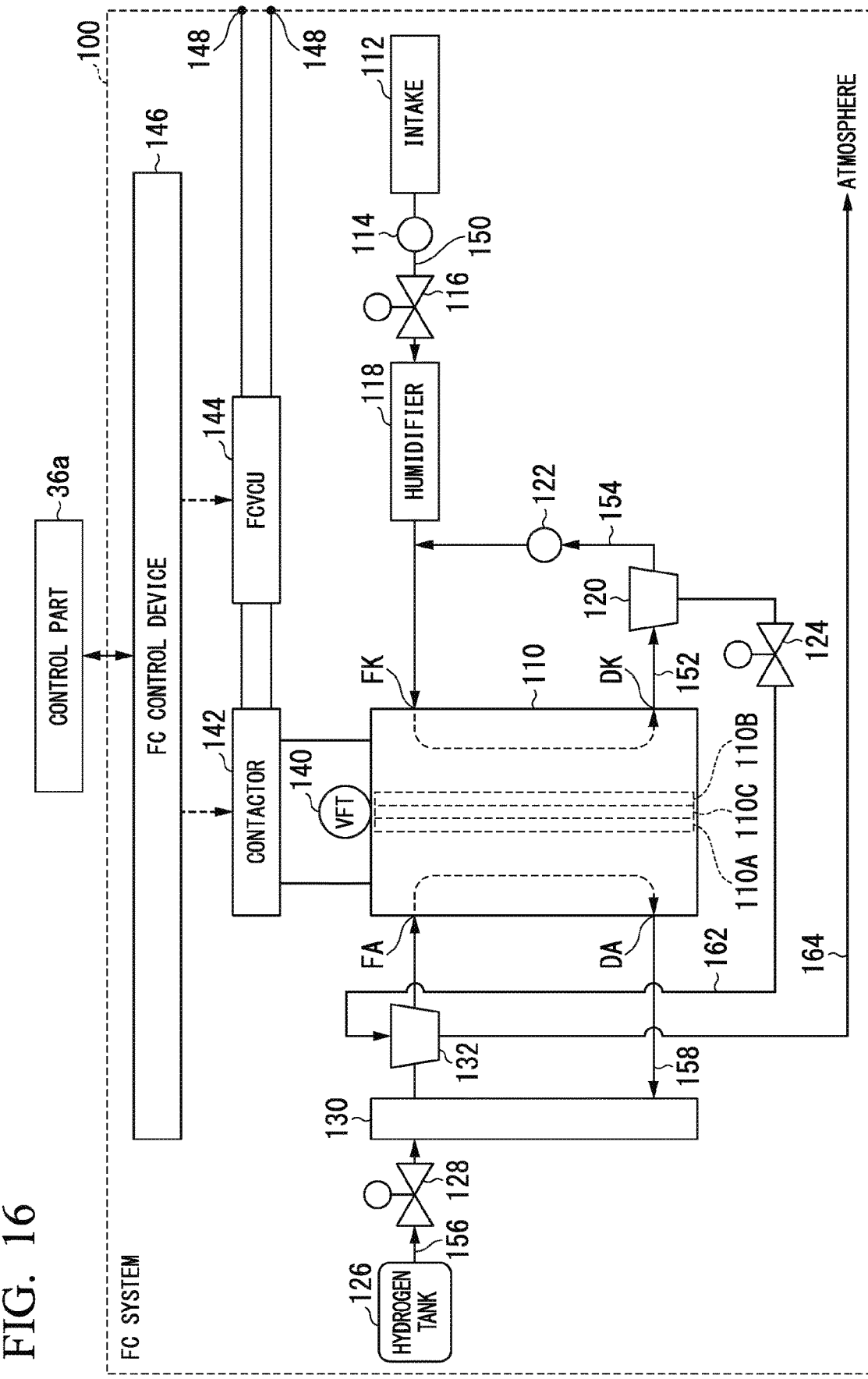
FIG. 16 is a view showing an example of a configuration of a FC system according to the second embodiment.

FIG. 16 is a view showing an example of a configuration of the FC system 100 according to the second embodiment. As shown in FIG. 16, the FC system 100 includes, for example, a FC stack 110, an intake 112, an air pump 114, a seal inlet valve 116, a humidifier 118, a gas-liquid separator 120, an exhaust recirculation pump 122, a drain valve 124, a hydrogen tank 126, a hydrogen supply valve 128, a hydrogen circulation part 130, a gas-liquid separator 132, a temperature sensor 140, a contactor 142, a FCVCU (Fuel Cell Voltage Control Unit) 144, an FC control device 146, an output terminal 148, an oxidizer gas supply passage 150, an oxidizer gas discharge passage 152, a fuel gas supply passage 156, a fuel gas discharge passage 158, a connection passage 162, and a drain pipe 164.

The FC stack 110 includes a laminate body (not shown) in which a plurality of fuel cell cells are laminated and a pair of end plates (not shown) that sandwich the laminate body from both sides in a lamination direction. The fuel cell cells include a membrane electrode assembly (MEA) and a pair of separators that sandwich the membrane electrode assembly from both sides in a junction direction. The membrane electrode assembly includes an anode 110A consisting of an anode catalyst and a gas diffusion layer, a cathode 110B consisting of a cathode catalyst and a gas diffusion layer, and a solid polymer electrolyte membrane 110C consisting of a cation exchange membrane sandwiched from both sides in the thickness direction by the anode 110A and the cathode 110B and the like.

A fuel gas including hydrogen delivered from the hydrogen tank 126 to the fuel gas supply passage 156 and a fuel gas circulated in the hydrogen circulation part 130 are supplied to the anode 110A. Air, which is an oxidizer gas (reaction gas), including oxygen as an oxidizer is supplied to the cathode 110B from the air pump 114. The hydrogen supplied to the anode 110A is ionized on an anode catalyst by a catalytic reaction, and a hydrogen ion moves to the cathode 110B via a moderately humidified solid polymer electrolyte membrane 110C. An electron generated in accordance with the movement of the hydrogen ion can be removed to an external circuit (the FCVCU 144 or the like) as a direct current. The hydrogen ion that moves from the anode 110A onto the cathode catalyst of the cathode 110B reacts with the oxygen supplied to the cathode 110B and an electron on the cathode catalyst and generates water.

The air pump 114 includes a motor that is controlled and driven by the FC control device 146 and the like.

The air pump 114 takes in and compresses air from the outside via the intake 112 by a drive force of the motor and feeds the compressed air to the oxidizer gas supply passage 150 connected to the cathode 110B.

The seal inlet valve 116 is provided on the oxidizer gas supply passage 150 that connects the air pump 114 to a cathode supply port FA which supplies air to the cathode 110B of the FC stack 110. The seal inlet valve 116 is opened and closed by a control of the FC control device 146.

The humidifier 118 humidifies the air delivered from the air pump 114 to the oxidizer gas supply passage 150. More specifically, the humidifier 118 includes, for example, a water-permeable membrane such as a hollow fiber membrane. The humidifier 118 adds moisture to the air by contacting the air from the air pump 114 through the water-permeable membrane.

The gas-liquid separator 120 separates the cathode exhaust gas that is not consumed by the cathode 110B and that is discharged from a cathode discharge port DK to the oxidizer gas discharge passage 152 into liquid water and the cathode exhaust gas. The cathode exhaust gas separated from the liquid water by the gas-liquid separator 120 flows into an exhaust recirculation passage 154.

The exhaust recirculation pump 122 is provided on the exhaust recirculation passage 154. The exhaust recirculation pump 122 mixes the cathode exhaust gas that flows from the gas-liquid separator 120 into the exhaust recirculation passage 154 with air that flows through the oxidizer gas supply passage 150 from the seal inlet valve 116 toward the cathode supply port FA and supplies again the cathode exhaust gas mixed with the air to the cathode 110B.

The liquid water separated from the cathode exhaust gas by the gas-liquid separator 120 is discharged through the connection passage 162 to the gas-liquid separator 132 provided on the fuel gas supply passage 156. The liquid water discharged to the gas-liquid separator 132 is discharged to the atmosphere via the drain pipe 164.

The hydrogen tank 126 stores hydrogen in a compressed state.

The hydrogen supply valve 128 is provided on the fuel gas supply passage 156 that connects the hydrogen tank 126 to an anode supply port FK that supplies hydrogen to the anode 110A of the FC stack 110. In a case where the hydrogen supply valve 128 is opened by a control of the FC control device 146, the hydrogen stored in the hydrogen tank 126 is supplied to the fuel gas supply passage 156.

The hydrogen circulation part 130 circulates, in the fuel gas supply passage 156, an anode exhaust gas that is not consumed by the anode 110A and that is exhausted from an anode discharge port DA to the fuel gas discharge passage 158.

The gas-liquid separator 132 separates the anode exhaust gas that circulates in the fuel gas supply passage 156 from the fuel gas discharge passage 158 into liquid water and the anode exhaust gas by an action of the hydrogen circulation part 130. The gas-liquid separator 132 supplies the anode exhaust gas separated from the liquid water to an anode supply port FK of the FC stack 110.

The temperature sensor 140 detects temperatures of the anode 110A and the cathode 110B of the FC stack 110 and outputs a detection signal to the FC control device 146.

The contactor 142 is provided between the FCVCU 144, and the anode 110A and the cathode 110B of the FC stack 110. The contactor 142 electrically connects the FC stack 110 to the FCVCU 144 or cuts off the connection between the FC stack 110 and the FCVCU 144 on the basis of a control from the FC control device 146.

The FCVCU 144 is, for example, a boost-type DC-DC converter. The FCVCU 144 is arranged between an electric load, and the anode 110A and the cathode 110B of the FC stack 110 via the contactor 142. The FCVCU 144 increases a voltage of the output terminal 148 connected to the electric load side to a target voltage determined by the FC control device 146. The FCVCU 144, for example, increases the voltage output from the FC stack 110 to the target voltage and outputs the voltage to the output terminal 148.

In a case where an electric power control part 56 determines that a warm-up of the FC system 100 is required and that a FC requirement electric power required by the FC system 100 is equal to or more than a predetermined value, the FC control device 146 performs a warm-up control of the FC system 100. The electric power control part 56, for example, acquires a detection signal by the temperature sensor 140 from the FC control device 146 and determines that the warm-up of the FC system 100 is required in a case where the temperature of the FC stack 110 detected by the temperature sensor 140 is less than a temperature threshold. The electric power control part 56 acquires the detection signal by the temperature sensor 140 from the FC control device 146 during the warm-up control of the FC system 100 and determines that the warm-up control of the FC system 100 is completed in a case where the temperature of the FC stack 110 detected by the temperature sensor 140 becomes equal to or more than the temperature threshold.

The control part 36a of the present embodiment estimates a degradation degree of the FC system 100 and further learns a degradation state of the FC system 100. For example, the control part 36a derives an electric power generation amount (hereinafter, referred to as a "current maximum electric power generation amount") of the FC system 100 per a predetermined amount of fuel gas. The control part 36a derives a maximum electric power generation amount ratio of the current maximum electric power generation amount relative to an initial maximum electric power generation amount on the basis of the current maximum electric power generation amount and the initial maximum electric power generation amount. The maximum electric power generation amount ratio is an example of information indicating the degradation state of the FC system 100. The initial maximum electric power generation amount is an amount of electric power generated by the FC system 100 at the time of shipping using a predetermined amount of fuel gas. The control part 36a outputs a derived result to the display control apparatus 60.

The acquisition portion 62A of the present embodiment acquires information (for example, information indicating a degradation state of the FC system 100) regarding the FC system 100 acquired by the control part 36a from the control part 36a continuously or at a predetermined time interval. The acquisition portion 62A of the present embodiment generates a record of the charge-discharge history information 64 on the basis of the acquired information and generates (updates) the charge-discharge history information 64.

The charge-discharge history information 64 of the present embodiment is, for example, information including one or more records in which information indicating a current maximum electric power generation amount and information indicating an acquisition date and time at which the current maximum electric power generation amount is acquired are associated with each other.

The evaluation portion 62B of the present embodiment evaluates a degradation amount of the battery 40 on the basis of the charge-discharge history information 64. The evaluation portion 62B extracts, for example, records in an evaluation target period (for example, one day) of the charge-discharge history information 64. Then, the evaluation portion 62B compares a current maximum electric power generation amount of the newest record with a current maximum electric power generation amount of the oldest record among the extracted records and derives a degradation amount at which the battery 40 degrades in the evaluation target period. The degradation amount is, for example, a capacity obtained by subtracting the current maximum electric power generation amount of the newest record from the current maximum electric power generation amount of the oldest record. Since subsequent processes are similar to the processes of the embodiment and modified examples described above, description thereof is omitted.

Here, in the FC system 100, there may be cases in which, by repeating electric power generation, the catalytic metal crystallizes, and the electric power generation amount of the FC system 100 per a predetermined amount of fuel gas becomes small (that is, the FC system 100 is degraded). The display control apparatus 60 of the present embodiment can make detailed information regarding the state change (in this case, degradation) of the FC system 100 to be an image that is visually understandable and provide a user with the image.

Although embodiments of the present invention have been described with reference to the drawings, the present invention is not limited to such embodiments, and various modifications and substitutions can be made without departing from the scope of the invention.

What is claimed is:

1. A display control apparatus, comprising:
a processor that executes instructions to:
acquire charge-discharge history information of a battery which stores electric power for traveling of a vehicle;
evaluate a state change amount of the battery based on the charge-discharge history information;
specify one or more factors of a state change of the battery based on the charge-discharge history information; and
display a first image indicating a ratio at which each of the one or more factors of the state change that are specified based on the charge-discharge history information contributes to the state change amount that is evaluated based on the charge-discharge history information for each of the one or more factors of the state change.

2. The display control apparatus according to claim 1, wherein the processor further executes instructions to display the first image for each predetermined period of time based on a history of the state change amount and a history of the one or more factors of the state change.

3. The display control apparatus according to claim 1, wherein the processor further executes instructions to display the first image based on a predetermined factor among the one or more factors of the state change.

4. The display control apparatus according to claim 1, wherein the processor further executes instructions to further display a second image that prompts prevention of degradation of the battery.

5. The display control apparatus according to claim 4, wherein the processor further executes instructions to display the second image in a case where an action that prevents degradation of the battery is performed based on the charge-discharge history information.

6. A display control method, comprising:
by way of a computer,
acquiring charge-discharge history information usage situation information of a battery which stores electric power for traveling of a vehicle;
evaluating a state change amount of the battery based on the charge-discharge history information;
specifying one or more factors of a state change of the battery based on the charge-discharge history information; and
displaying a first image indicating a ratio at which each of the one or more factors of the state change that are specified based on the charge discharge history information contributes to the state change amount that is evaluated based on the charge-discharge history information for each of the one or more factors of the state change.

7. A computer-readable non-transitory storage medium that comprises a program causing a computer to:
acquire charge-discharge history information of a battery which stores electric power for traveling of a vehicle;
evaluate a state change amount of the battery based on the charge-discharge history information;
specify one or more factors of a state change of the battery based on the charge-discharge history information; and
display a first image indicating a ratio at which each of the one or more factors of the state change that are specified based on the charge-discharge history information contributes to the state change amount that is evaluated based on the charge-discharge history information for each of the one or more factors of the state change.

8. A display control apparatus, comprising:
a processor that executes instructions to:
acquire usage situation information of a battery which stores electric power for traveling of a vehicle;
evaluate a state change amount of the battery based on the usage situation information;
specify one or more factors of a state change of the battery based on the usage situation information, based on a time for which a factor among the specified one or more factors is satisfied and a weight that corresponds the factor, calculate a ratio at which the factor of the state change contributes to the state change amount; and
display a first image indicating a ratio at which the factor of the state change contributes to the state change amount for each factor of the state change.

* * * * *